(12) United States Patent
Pomata et al.

(10) Patent No.: US 6,909,796 B2
(45) Date of Patent: Jun. 21, 2005

(54) IMAGING SYSTEM AND METHOD

(75) Inventors: Francesco Pomata, Genoa (IT); Franco Bertora, Genoa (IT)

(73) Assignee: Esaote S.p.A., Casale Monferato (IT)

(*) Notice: Subject to any disclaimer, the term of this patent is extended or adjusted under 35 U.S.C. 154(b) by 671 days.

(21) Appl. No.: 09/939,082

(22) Filed: Aug. 24, 2001

(65) Prior Publication Data

US 2002/0028009 A1 Mar. 7, 2002

(51) Int. Cl.$^7$ .............................................. G06K 9/00
(52) U.S. Cl. ..................... 382/131; 382/284; 128/922
(58) Field of Search ............................... 382/131, 284, 382/264, 274, 128, 278; 128/922; 600/300, 425; 378/4, 21; 250/363.02, 363.04, 583

(56) References Cited

U.S. PATENT DOCUMENTS

| | | | | |
|---|---|---|---|---|
| 5,065,763 A | * | 11/1991 | Green et al. | 600/453 |
| 5,522,391 A | * | 6/1996 | Beaudin et al. | 600/443 |
| 5,808,962 A | * | 9/1998 | Steinberg et al. | 367/7 |
| 6,442,414 B1 | * | 8/2002 | Watanabe | 600/419 |
| 6,618,607 B2 | * | 9/2003 | Song | 600/410 |
| 6,731,413 B1 | * | 5/2004 | Nakazawa et al. | 358/502 |

* cited by examiner

*Primary Examiner*—Bhavesh M. Mehta
*Assistant Examiner*—Barry Choobin
(74) *Attorney, Agent, or Firm*—Woodard, Emhardt, Moriarty, McNett & Henry LLP

(57) ABSTRACT

Imaging method and system including thermal noise reduction for ultrasonic and magnetic resonance images. In ultrasound imaging, this method provides thermal noise reduction and a reduction of artifacts in applications with contrast agents. The method includes the computation of a simple correlation function to be applied where two or more images or vectors of the same region of the body are provided. The signals relating to the images or the vectors are: combined by a weight function which, by comparing corresponding samples of the signals or vectors, assumes values in a range between a maximum value and a minimum value depending on the mutual correlation measure between the samples. The weight function is combined with the combination of the two response signals (P1, P2, MR1, MR2). The resulting signal is transformed into image data. The signals are processed based on the peculiarities of the selected imaging system.

44 Claims, 5 Drawing Sheets

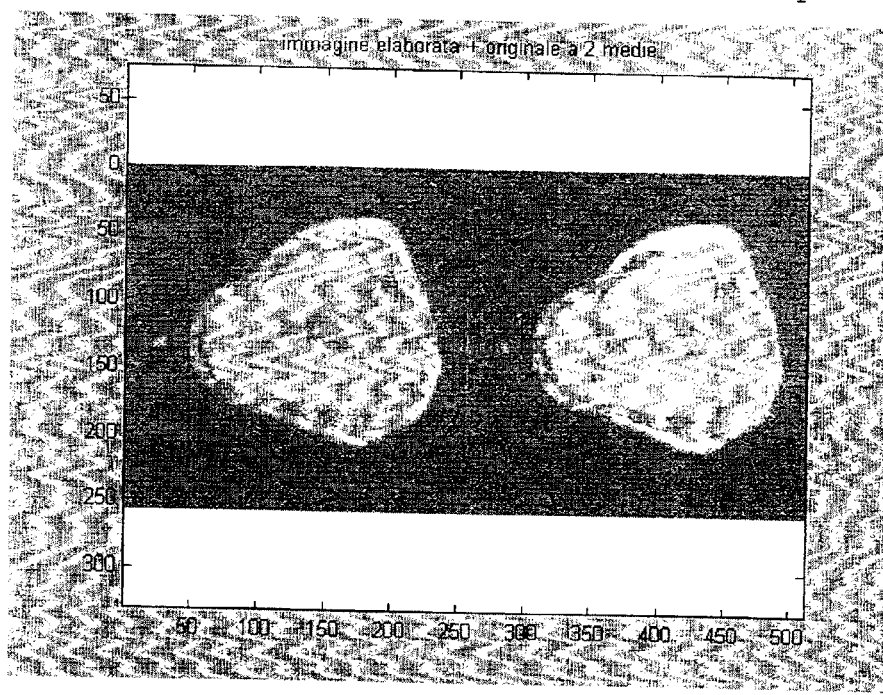
Fig. 6 EXAMPLE OF MAGNETIC RESONANCE IMAGING

IMAGING SYSTEM AND METHOD

REFERENCE TO RELATED APPLICATION

The present patent application claims foreign priority benefits under 35 U.S.C. §119 to Italian patent application No. SV2000A000036, filed Sep. 7, 2000, now pending.

BACKGROUND OF THE INVENTION

The invention relates to an imaging method including the following steps:

emitting at least two successive pulses;

receiving reflection or matter excitation signals, generated by the object body in response to said two pulses;

processing the received signals, in a manner dependent on their nature and transmission mode combining together said two received signals and transforming the combined signal into image data related to the pulses emitted into the object body.

Imaging is widely used as a highly non-invasive diagnostic method. This technique substantially consists in generating electromagnetic or acoustic waves propagating in one direction and in observing electromagnetic radiation caused by relaxation of the matter previously excited by the electromagnetic waves transmitted to the object body or the echoes generated when the transmitted acoustic wave is reflected and impacted against the interfaces between regions having different densities. For a predetermined direction of the acoustic wave, the so-called line of view, or for a predetermined focus of the electromagnetic waves in a section plane of the object body, image pixels are generated as being positioned in a two-dimensional image plane or in a three-dimensional image volume and as having a brightness corresponding to the information contained in the received response pulses.

Two prior art basic techniques are used with the above method, i.e. ultrasound imaging and Nuclear Magnetic Resonance.

The ultrasound imaging method consists in generating an ultrasonic acoustic wave propagating in one direction (line of view). Reflection signals are received and image pixels are generated by generating a point having a brightness proportional to the echo amplitude at a predetermined coordinate which is defined as a function of time after the acoustic wave pulse transmitted by the object body in the direction of the desired line of view.

In Nuclear Magnetic Resonance imaging, electromagnetic pulses are excited from nuclei as a response to the emission of radio frequency electromagnetic pulses. In this case, instead of a single line of view, for each pulse transmitted to the object body, slices of the latter are selected and the matter relaxation echoes resulting from the excitation pulses are reprocessed as a function of the slice selected during emission, to be univocally correlated to single image points of the slice corresponding to the one selected during excitation.

Both imaging techniques have considerable drawbacks which, in certain cases, hinder a correct interpretation of images and correspondence with reality. Said problems are mainly caused by thermal noise and by the production of object body motion and micro-motion artifacts and, particularly in ultrasound imaging associated with the use of contrast agents, by an incomplete rejection of the highly reflective regions of the body which are not perfused by contrast agents. These incompletely rejected regions generate a "Clutter" artifact which can overlap, and possibly hide, the contrast agent signal.

Several prior art echo signal processing techniques are known which try to restrict or filter out noise and/or artifacts in ultrasound contrast imaging i.e. in the ultrasound imaging carried out with contrast agents injected in the object body. These techniques provide complex echo signal filtering and/or autocorrelation procedures aimed at the recognition of unrelated signal components (such as noise), and at the removal or limitation of these components. Prior art procedures complicate the structure of the apparatus implementing them and also require comparatively long processing times.

The latter shortcoming is in contrast with the needs to obtain visible images in the shortest time, i.e. in real time, these needs being almost compulsory in ultrasound imaging combined with contrast agents.

In Nuclear Magnetic Resonance imaging several techniques are also known for reducing thermal noise and filtering out artifacts, which are also considerably complex and require long processing times and/or a complication of the hardware structure of imaging systems.

Therefore, the invention has the object to provide a method as described hereinbefore, which allows to obviate the above drawbacks in a fast and inexpensive manner and without involving a more complex construction of the apparatus.

The invention achieves the above purposes by providing a method as described above, which includes the following steps:

combining the response signals, i.e. the echoes relating to the two successive ultrasonic or electromagnetic pulses in an electromagnetic pulse excitation sequence, by a weight function which, by comparing corresponding samples of the two response signals, assumes values in a range between a maximum value and a minimum value depending on the mutual correlation measure between said corresponding samples of the two response signals.

combining the weight function thereby obtained with the combination of the two response signals and transforming the resulting signal into image data, i.e. image points (pixels, voxels).

According to a further characteristic, the weight function has two predetermined maximum and minimum values which are assumed when the corresponding components of the two successive response signals have equal or opposite phases respectively, whereas in case of partly unrelated signal components the function assumes intermediate values.

It is possible to use a correlation weight function having a continuous development or a function having discrete values.

Advantageously, the method of the invention provides response signal sampling before processing.

Moreover, the method of the invention may provide filtering of the at least two successive response signals related to the two successive identical pulses before their combination with each other and/or with the weight function and/or after their combination with each other and/or with the weight function.

An advantageous correlation determination function to implement the method is the function EXNOR applied to the signs of the samples of the two successive response signals.

The combination of the two response signals related to the two identical successive ultrasonic or electromagnetic pulses transmitted to the object body may be obtained by any function, for instance a signal subtraction or addition or multiplication or division function.

The weight function may be further averaged, e.g. by integration or low-pass filtering.

The method of the invention may be also implemented with functions other than the EXNOR sign function, and providing values in the range between a minimum value and a maximum value depending on the occurrence of predetermined conditions of comparison between the at least two response signals to the two identical successive pulses transmitted to the object body.

According to a further variant, particularly relevant in ultrasound imaging but also applicable to Nuclear Magnetic Resonance imaging, the correlation weight function, possibly averaged, or integrated or filtered, may be combined with a thresholding function, which assigns the value 0 if the response signals exceed a predetermined threshold and the value 1 if they are below a predetermined threshold, or vice versa. The two threshold values may generally be different between the two vectors P1 and P2 representing the two received and sampled response signals. Two different threshold signals will provide a more progressive threshold application.

A function suitable for the purpose is the logic NOR function applied to the most significant N bits of the signal value. In fact, the signal is represented in a Kbit scale plus a sign bit. In ultrasound imaging, for instance, due to the high reflectivity differences between blood (or contrast agent) echoes and the reflecting CLUTTER generating structures, which differences are of the order of 1:100, a threshold level is easily obtained. The total Kbits may be divided into K1+N where K1+N=K. The signal shall be kept if it falls within the first K1 bits, and attenuated or zeroed if it reaches the bit K1+1. If different thresholds are provided, the most significant N bits for the P1 signal and the most significant M bits for the P2 signals will be considered.

The thresholds are determined with reference to the number (N, M) of most significant bits being considered in the NOR function. The two P1 and P2 signals may be also evaluated by considering their magnitudes.

Thresholds may be also determined by referring to the most significant N bits of one of the two vectors considered in its magnitude.

The techniques for focusing the emitted ultrasonic beams, for reconstructing the vectors related to the echo signals and for image processing/reconstruction from echo signals are conventionally known. In this case, both two- and three-dimensional scanning and reconstruction techniques may be used. The above also applies to the implementation of the method of the invention to Nuclear Magnetic Resonance imaging techniques.

The invention also pertains to an ultrasound imaging system for implementing the above method, which includes at least one transducer for transforming electric signals into an ultrasonic pulse, preferably a geometrically and numerically predetermined transducer array;

at least one receiving transducer, the same as the transmitting transducer or separate therefrom, preferably a geometrically and numerically predetermined receiving transducer array, which may be the same as the transmitting transducer array or separate therefrom;

means for controlling the transmitting and receiving transducers for alternate transmission and reception activation;

means for focusing ultrasonic beams in a certain propagation direction, i.e. along a predetermined line of view by synchronized activation of the transmitting transducers, when a transmitting transducer array is provided;

means for focus reconstruction relative to the received echo signals, when a receiving transducer array is provided, by resettling synchronization relative to the signals received by the individual transducers, with reference to transmission synchronization;

means for sampling the received echo signals;

means for combining together two successive received echo signals;

means for processing the received echo signals to remove the undesired signal components;

means for transforming the processed echo signals into image signals related to at least one point or one line of a three- o two-dimensional image formed by a set of points (pixels or voxels) or by a set of lines.

With reference to this invention in its most general form, the above system provides that the means for processing the received echo signals which allow removal of undesired signal components comprise means for weighting the received signals based on the mutual correlation of identical or corresponding samples of two echo signals related to two successively emitted transmission pulses having equal or opposite phases.

A preferred correlation rule consists in comparing the relative phase conditions of the samples corresponding to the two echo signals, the weight being determined in a range between a maximum value and a minimum value depending on phase coincidence or phase opposition conditions. Phase (as is known from literature) may be determined by the EXNOR function applied to the sign of two corresponding samples of the two P1 and P2 vectors.

The method and system of the invention allow to obtain a simple noise reduction and to limit, i.e. reduce noise. Moreover, the weight function also allows, in the condition of use with opposite phase transmission signals, to remove or anyway limit the generation of artifacts or clutter, generated for instance in ultrasound second harmonic imaging with the Pulse Inversion method. In fact, in this case, the different processing methods used to date provide removal of the received echo signals caused by two successive pulses of opposing phases (Pulse Inversion). Such removal occurs based on the sum of the samples of the two received echo signals, and only leads to a partial rejection of the motion undesired signals (Clutter). The weight function in this case drastically decreases clutter (any fundamental frequency signals of opposing phase being emitted are interpreted as "unrelated" thereby increasing rejection) as well as the unrelated thermal noise between the two scans.

Therefore, the method and system of the invention, besides providing the inexpensive and fast possibility to remove or at least reduce noise, also implement the basic processing steps, or at least a few basic processing steps of some ultrasound second harmonic imaging techniques.

From the practical point of view, the method of the invention may be inexpensively implemented in an ultrasound imaging system or apparatus or in a Nuclear Magnetic Resonance system or apparatus and its application is fast.

The method, i.e. the steps in which the samples are compared, interpreted and weighted, may be easily implemented in suitable dedicated or programmable hardware. Those skilled in the art can both create a logic circuit operating according to the selected logic function to define the weight function, e.g. the EXNOR function, and to appropriately program any programmable hardware. The choice between these two opportunities also depends on the general structure of the system or apparatus with further reference to other features that are beyond the scope of this invention.

It shall be noted that the method of the invention, hence the system and apparatus for implementing it may be provided in combination with several imaging modes. Particularly, the method of the invention may be used, for instance, with the conventional imaging technique, in which the received echo signals are processed and evaluated with reference to the fundamental frequency component. In this case the method of the invention allows to reduce noise and to provide output image signals having an optimized signal to noise ratio.

Another application is in the field of Harmonic Imaging, either with or without contrast agents. In this imaging mode, echo signals are processed with reference to a harmonic component of the fundamental frequency, typically with reference to the second harmonic. Therefore, the fundamental component must be removed from echo signals and in this case, the method of the invention allows to remove in a simple, fast and inexpensive manner the effect of the generation of undesired motion artifacts or clutter, due to the fact that when tissues of parts of the body move, uncontrolled signal dephasing occurs, which gives non-zero contributions upon processing to remove the fundamental frequency component of the received echo signals.

SUMMARY OF THE INVENTION

An imaging method according to one embodiment of the present invention comprises the steps of emitting at least two successive pulses along the same line of view into an object body, receiving reflection or matter excitation signals generated by the object body in response to the two pulses, combining together the response signals and transforming the combined signal into image data related to the transmission view line of the pulses emitted into the object body. The invention being characterized by the following steps which include, combining the response signals relating to the two successive pulses by a weight function which, by comparing corresponding samples of the two echo signals, assumes values in a range between a maximum value and a minimum value depending on the mutual correlation measured between the corresponding samples of the two signals, combining the weight function obtained with the combination of the two echo signals and transforming the resulting signal into image data, such as image points in the form of pixels and voxels.

An imaging system for implementing the imaging method of the present invention according to a related embodiment comprises means for generating a succession of pulses and means for emitting the pulses towards the object body, means for receiving the response signals derived from emitted pulses, means for processing the response signals and transforming them into image points related to the information contained in the response signal regarding their position and luminous intensity, the set of points forming a linear, two-dimensional or three-dimensional image. The imaging system is characterized in that it further comprises means for successively repeating, at least once, an identical pulse, in order to generate at least two successive related and theoretically identical response signals, and means for weighting the received signals based on the mutual correlation of identical or corresponding components of the at least two response signals corresponding to the at least two identical transmission pulses successively emitted along the same line of view.

The invention relates to further improvements which will form the subject of the appended claims.

The characteristics and advantages of the invention will appear more clearly from the following description of a few non limiting embodiments, referred to the annexed drawings.

BRIEF DESCRIPTION OF THE DRAWINGS

FIG. 6 shows a Nuclear Magnetic Resonance image processing example.

DESCRIPTION OF THE PREFERRED EMBODIMENTS

Figure 1:
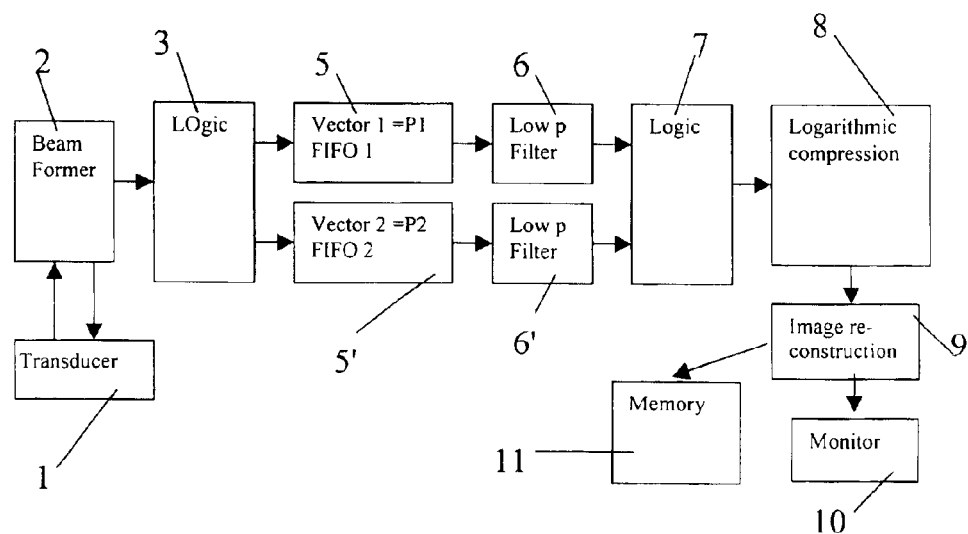
FIG. 1 is a block diagram of the processing chain with reference to the method of the invention, which generally applies to different types of signal processing methods.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, an ultrasound imaging system or apparatus comprises a probe 1 consisting of a plurality of transducers which transform electric signals into acoustic ultrasonic waves and vice versa. The probe 1 is alternately controlled for transmission and reception by an alternate transmission and reception activating circuit, denoted with numeral 2. A beamformer or collimator 3 provides the electric signals for activation of the transducers to emit the desired ultrasonic beam and for synchronized activation of the individual transducers in such a manner as to focus the beam deriving therefrom in a predetermined direction of propagation and/or view (with reference to the resulting image). The section 3 (beamformer) also comprises the section for forming the received reflection beam, by applying the appropriate delays to the signals of the different transducers to focus the deriving beam in the desired direction. The section 3 also includes means for sampling the received echo signals for further digital processing of echo signals.

With reference to the method of the invention, two successive pulses are emitted for each line of view, said pulses being in-phase in the case of fundamental frequency imaging or of contrast agent detection with the subtraction method or out-of-phase in the case of Pulse Inversion imaging and the reflection echoes of said pulses are received. The signals corresponding to the reflected echoes are processed as described above and stored in the form of vectors, denoted as P1 and P2 in FIG. 1, in a corresponding dedicated FIFO memory 5, 5' (First In First Out).

Then the signals are filtered with a passband filter 6, 6' which, depending on the imaging mode, i.e. B-Mode for imaging at the fundamental transmission frequency or Harmonic imaging for second or higher harmonic imaging, has the function to select the best signal band based on depth (e.g. in the form of adaptive filter) or, in the case of Harmonic Imaging, to extract the second or higher harmonic frequency component of echo signals (e.g. in the form of extraction filter). At the output of the filter the two signals P1 and P2 are processed through two parallel chains. The two parallel chains are shown for the sake of exemplification clarity. In fact, a single chain may be used, in which the two vectors P1 and P2 transit alternately and the outputs may be stored for further processing. The subsequent operations, i.e. the combination of the two signals and the determination of a weight function (in this case the EXNOR sign function), which may be further averaged, for instance by integrating or filtering the weight signal. The weight function is then multiplied by the combination signal P of the two combined signals. These functions are performed by specially created and/or programmed logic circuits 7. The output signal is then subjected to logarithmic compression in 8 and transformed into image data in a unit 9 known per se. Image data may be displayed in the form of pixels on a monitor 10 and/or also stored in a memory 11.

The EXNOR sign function has the characteristic of assuming the value 0 when the two signs are different and the value 1 when the signs are equal. When signals are unrelated or partly dephased, the function will assume the values 0 and 1. The mean obtained by integration or low-pass filtering will cause the resulting function to assume the value 0 in case of signals of opposing phase, the value 1 in case of identical signals and intermediate values for unrelated or partly correlated signals. This function will be hereafter conveniently defined as a WEIGHT function.

The above method is suitable for application to several ultrasound imaging modes, whereof three cases are described hereafter by way of example:

The first case consists in traditional ultrasound imaging with the so-called B-Mode, wherein echo signals relative to the fundamental frequency component are only processed, the position of the reflection point being defined depending on reception time, and the signal amplitude affecting the brightness of the corresponding pixel or voxel of the corresponding image unit region.

In this imaging mode, the technique provides an improved signal to noise ratio as compared with simple average. Noise is essentially caused by input thermal noise.

Since thermal noise is highly unrelated to the echo signal, the WEIGHT function will assume intermediate values from the minimum 0 and the maximum 1.

By receiving signals with the conventional techniques and combining them, then multiplying them by the WEIGHT function, noise components of the signal are attenuated, and the signal-to-noise ratio is improved.

Figure 2:
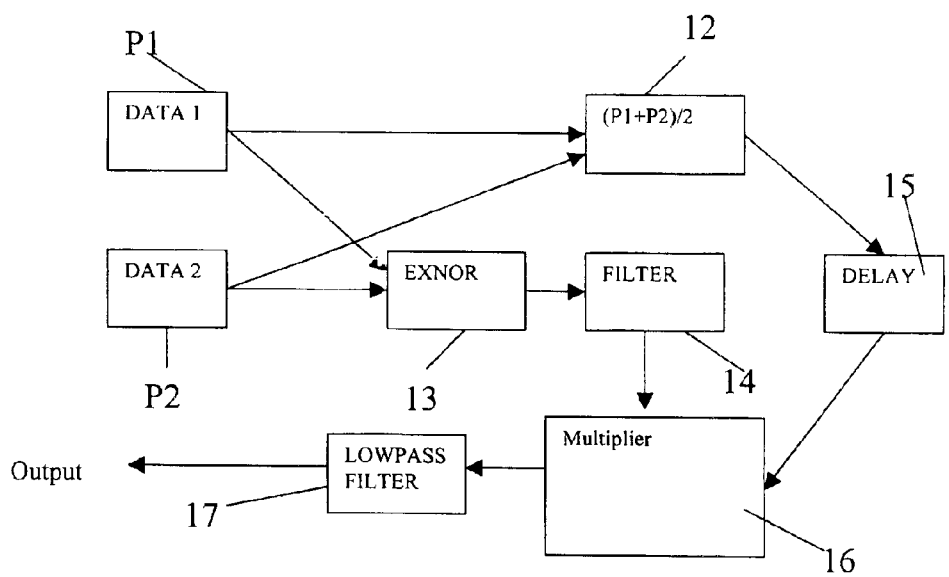
FIG. 2 is a more detailed block diagram of the processing chain according to the invention in conventional ultrasound imaging (B-Mode) and in second harmonic processing with the Pulse Inversion method.

With reference to the above embodiment and with particular reference to FIG. 2, the latter shows in detail the logic circuit roughly represented in FIG. 1 and denoted with numeral 7 in the latter. The data of the two vectors which represent the sampled echo signals P1 and P2 are provided as an input to two different processing chains. A first chain includes a summer and divider circuit 12 which sums the two vectors and divides the sum by two. The data of the two vectors are then provided to a circuit 13 which applies the EXNOR function on their sign. This circuit is substantially a phase comparator which provides output values 1 in case of equal signal signs and 0 in case of opposite signal signs. The subsequent integration logic provides an output value 1 in case of in-phase signals, and 0 in case of out-of-phase signals and intermediate values in case of partial dephasing or thermal noise. The output of the integration logic (FILTER) 13 is the WEIGHT function.

A delay is added in 15 to the output signal of the summer 12 to restore the time coincidence with the signal output from the parallel WEIGHT function computation chain. The WEIGHT function and the summer output 12 are provided to a multiplier. The WEIGHT signal output from the circuit 14 has the function of a statistic weight to be applied to the correlation between identical components of the two signals P1 and P2 and said WEIGHT is multiplied, in the multiplier 16, by the corresponding components of the sum signal of the two signals P1 and P2. Prior to final processing, the signal may be possibly further filtered.

The operation performed by the WEIGHT function on the sum of the signals P1 and P2 in the multiplier 16 equals a compression of the signal component due to thermal noise which, as specified above, is highly unrelated to the information component of the echo signals.

The circuit of FIG. 2 may be used with appropriate slight changes for processing echo signals in Pulse Inversion imaging mode. The above method allows imaging to be performed by exploiting the second harmonic component of echo signals, as referred to ultrasonic pulse transmission fundamental frequency. This technique is named Pulse Inversion and particularly finds an important application in the study of the object body perfusion by contrast agents. These contrast agents have a non linear reflective behavior and reflect signals at the second harmonic frequency or at higher harmonics of the fundamental frequency of the incident signal.

Since the amplitude contribution of the fundamental frequency component of echo signals is higher than the second harmonic frequency component, a high rejection of said fundamental frequency component of the echo signal must be achieved upon processing. In this second embodiment of the method according to the invention, one of the two transmission signals has its polarity inverted. While the echo signal components having frequencies twice the fundamental frequency (second harmonic) remain in phase with each other, the fundamental frequency of echo signals invert phases, hence when the two signals are subjected to summation like in the summer/divider 12, said fundamental frequency components destroy each other. Unfortunately this is only true in case of stationary reflecting surfaces or bodies. However, when the reflecting surfaces or bodies move, phase inversion is not perfect and this produces undesired signals, i.e. clutter, generating artifacts on the resulting image, which means that the rejection of the regions beyond the contrast agent is incomplete. With reference to this second embodiment, FIGS. 1 and 2 still apply. Nevertheless, in FIG. 1 the filters 6 and 6' are used to filter out the second or higher harmonic frequency signal components.

The steps of the procedure are the same as those indicated for the previous embodiment. In this case, the WEIGHT function, i.e. the signal output from the circuit 14 not only performs noise reduction but also provides further clutter attenuation. In fact, EXNOR on P1 and P2 provides the value 0 in case of phase opposition, i.e. of fundamental frequency components of the two signals and the value 1 in case of phase concordance, i.e. of second harmonic frequency signals, and a value close to 0 in case of motion, i.e. when the fundamental frequency components of signals are slightly dephased due to motion.

The sum function performed in the summer 12 also has the purpose to remove or drastically reduce the fundamental frequency components and by multiplying this sum signal by the WEIGHT signal, it allows to further limit or reduce any undesired signal produced by a slight dephasing due to motion of the reflecting surfaces. In fact, for undesired signal components (clutter), the weight signal assumes values below 1 and generally very close to zero. In addition to the removal or strong limitation of clutter signals, the undesired thermal noise contribution is also limited and reduces, in the same manner as described in the previous example.

Figure 4:
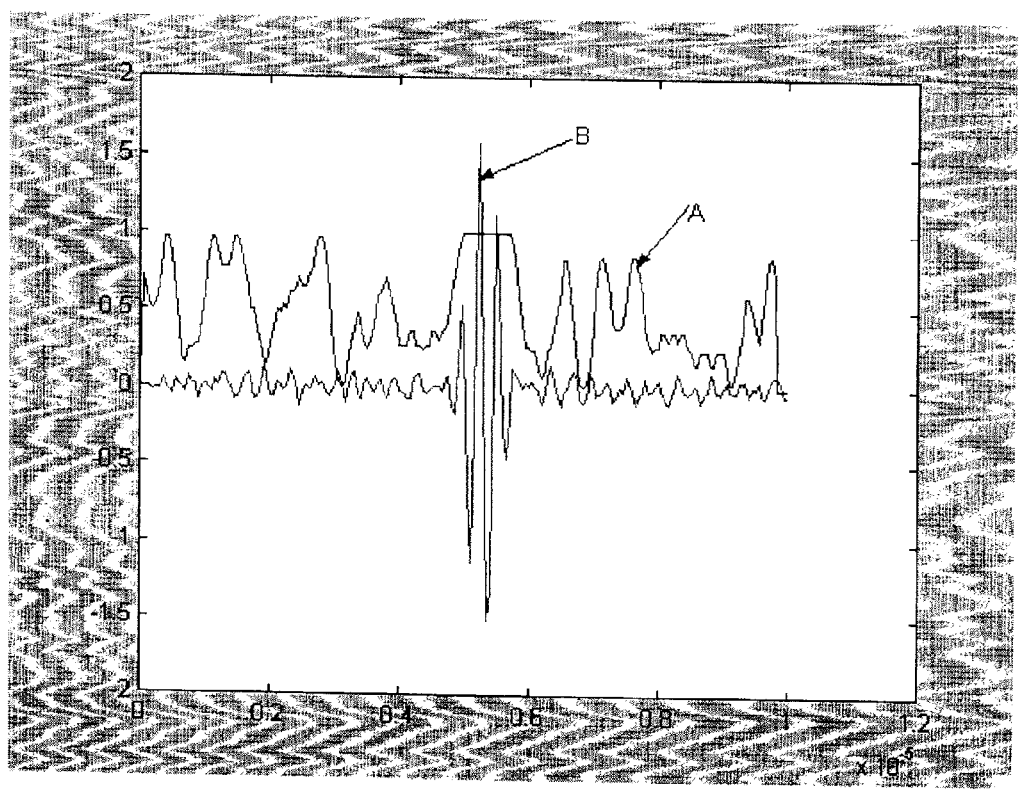
FIG. 4 shows a comparison between the received signal and the weighted signal processed with the method of the invention.
Figures 5A, 5B:
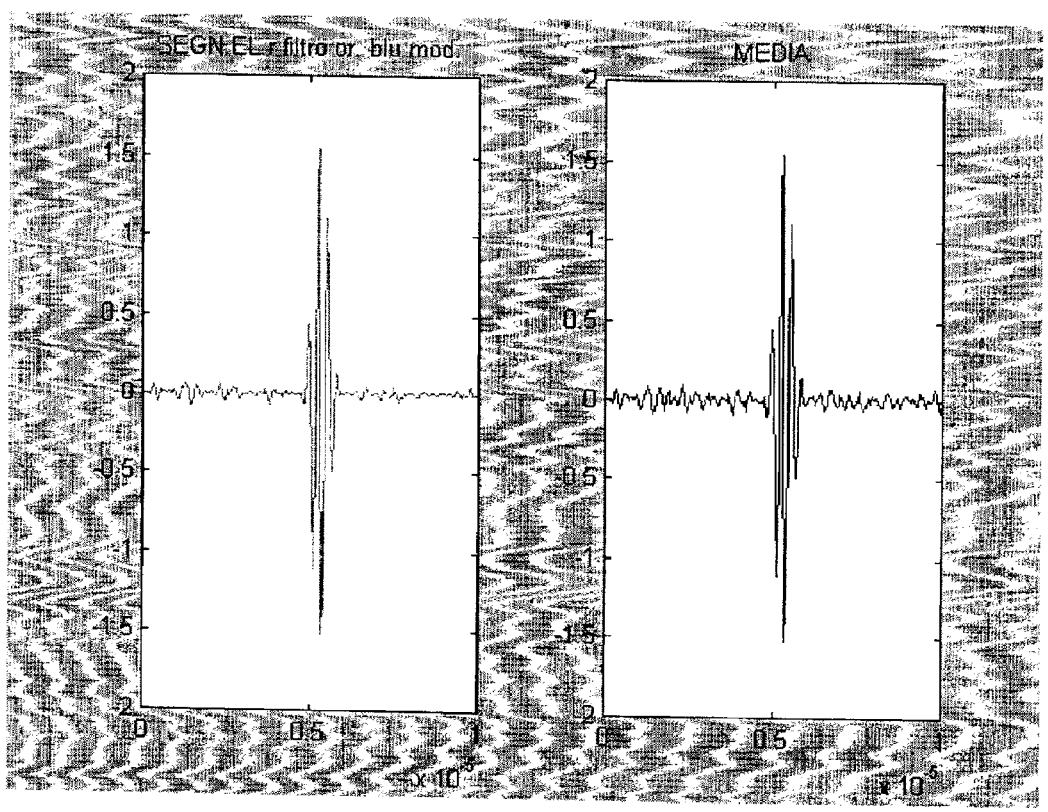
FIGS. 5A and 5B show a signal processed with the method of the invention (FIG. 5A) and the simple average between the two signals (FIG. 5B).

FIGS. 4, 5A and 5B show the effect of the method according to the invention.

In FIG. 4, the curve B shows one of the two input signals. The signal A is the representation of the corresponding WEIGHT function. FIG. 5A shows the signal processed with the method according to the invention. FIG. 5B shows the simply averaged signal.

When contrast agents are used, another imaging mode with contrast agents (perfusion) may be used, which allows a high rejection of the non-moving structure components of the echo signals as compared with the components of the echo signals relating to moving structures and to the destruction of microbubbles of contrast agents. This imaging technique consists in directly subtracting the received echo signals relating to two successive identical transmission pulses along the same line of view.

Scanning is repeated twice like in the previous case, whereas the two received echo signals are directly subtracted instead of being subjected to pulse inversion.

Nevertheless, here again, any slight relative motion between the object body or parts thereof and the probe 1 generate clutter signals which limit the rejection of the fundamental frequency component of the echo signal, i.e. the one having the same frequency as the ultrasonic pulses emitted by the probe.

Figure 3:
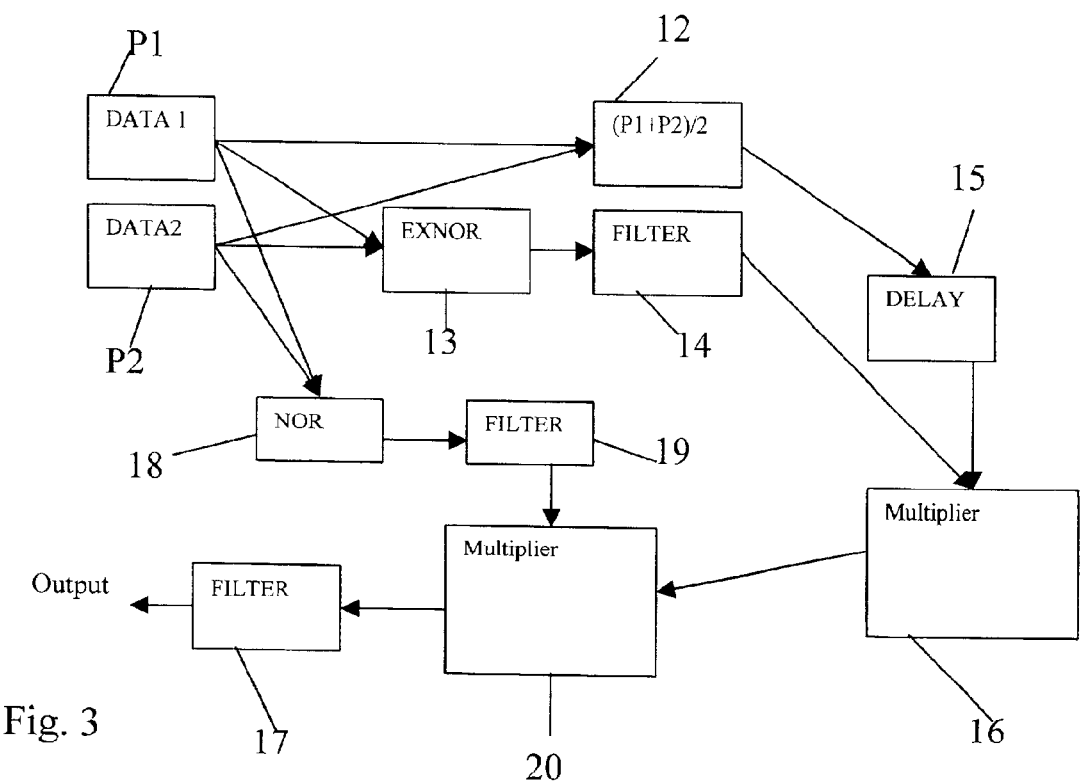
FIG. 3 is a detailed block diagram of the processing chain according to the invention in ultrasound second harmonic imaging with direct subtraction of echo signals.

The method of this invention is applicable as described hereinbefore to the above method and in a more general embodiment, the logic circuit of FIG. 2 may be applied, the only difference therefrom being that, a subtraction/division circuit, denoted as 12' in FIG. 3, is used instead of a summer/divider.

The steps of the method are identical and provide the same results in terms of noise reduction.

However, according to an improvement of the method, there may be provided an additional step for defining specific amplitude thresholds for echo signals above which the signal is annulled, and below which the signal is kept.

These thresholds are necessary to account for the high reflectivity difference between contrast agents, blood or other fluids flowing in the object body and hyperechogenic tissues subject to micromotion which generates high intensity signal peaks.

In this case, the invention provides, as an additional improvement, the use of an additional chain, parallel to the previous subtraction and division and EXNOR application chains, to determine the WEIGHT signal. In this additional processing chain, one or more thresholds are determined depending on the desired accuracy level. Thresholding is performed by means of an additional logic weight function, which assumes the value 0 when the echo signal is above the threshold and the value 1 when the echo signal remains below the threshold. The threshold is determined by considering a number of most significant bits N and the N value determines the threshold value. The vectors only containing the most significant bits N of P1 and P2 are defined as P1" and P2". An example of a logic function suitable for the purpose is the function NOR applied on the most significant N bits of the echo signal module. More in detail, the function WEIGHT1=NOR[abs(P1"; P2")] is performed in the additional processing chain, by only considering the most significant N bits of the vectors corresponding to the P1 and P2 signals. WEIGHT1 will be a vector containing 0 and 1, 0 if at least a 1 is included among the most significant N bits, 0 in all other cases. In this case the WEIGHT1 function will assume the following values:

1: when P1(n) and P2(n) are below the threshold.

0: when P1 or P2 are above the threshold

The above NOR function is performed by the logic circuit denoted as 18. Possibly, the signal output from the circuit 18 is integrated or low-pass filtered in the filter 19 which also generates intermediate values between 0 and 1 and is provided to the multiplier 20 in which the signal related to the above defined WEIGHT1 signal is multiplied by the signal output from the block 16. In the diagram of FIG. 3, the delays introduced by the filters 14 and 19 are assumed to be equal. In this case, a single delay element is required.

Here again, the method according to the invention provides both an improved rejection of the fundamental frequency components of echo signals, by suppression or drastic reduction of undesired clutter signals, and an effective thermal noise reduction as well as an additional signal discrimination based on intensity thresholds, the whole in a fast and simple manner in terms both of processing and of the hardware needed for the implementation of the method.

In case of Magnetic Resonance imaging, the processing part is wholly software based and is executed in the dedicated system. The procedure is anyway identical to what is described above regarding noise reduction in ultrasonic images. The two or more vectors containing the conventionally acquired image data, which include data as real part and imaginary part are divided into vectors only containing the real part and vectors only containing the imaginary part. For instance, the vector of the first image, defined as M1 is resolved into the two vectors MR1 (containing the real part) and MI1 (containing the imaginary part), the vector of the second image, defined as M2 is resolved into the two vectors MR2 and MI2 and so on.

Correlation is computed between homologous vectors, e.g. MR1 and MR2 on the one hand and MI1 and MI2 on the other (in the case under examination by executing the EXNOR data sign function). The result of this operation (which is software implemented in this case) is then integrated by a low-pass filter which provides the intermediate values as outputs.

By this arrangement two pairs of WEIGHT vectors will be obtained, which will be named WEIGHTR (for the real part) and WEIGHTI (for the imaginary part). These pairs of vectors may be combined in several manners without affecting the functionality of the invention. In the selected implementation, an average between the two vectors has been determined, i.e.:

WEIGH$T$=(WEIGHT$R$+WEIGHT$I$)/2

The resulting WEIGHT is then shifted to account for the delay introduced by the filtering operation. The result is then combined with (in this case multiplied by) the conventionally determined average of the two initial vectors M1 and M2. By this arrangement, two new vectors M1' and M2' are obtained, which form the input to the final processing part. The result is shown in FIG. 6, in which the left part shows the result of the new processing on the image, whereas the right part shows the result of the simple average of the two image data. It shall be noted that the two images have been shown in a logarithmic scale instead of the linear scale, as is conventional in NMR images. This display form is selected to highlight more easily the noise level.

Obviously, the invention is not limited to what has been described and illustrated herein, but may be widely varied, especially as regards construction, without departure from the guiding principle disclosed above and claimed below.

What is claimed is:

1. An imaging method including the following steps:
   emitting at least two successive pulses along the same line of view into an object body;
   receiving reflection (P1, P2) or matter excitation (MR1, MR2) signals, generated by the object body in response to said two pulses;
   combining together said two response signals (P1, P2; MR1, MR2) and transforming the combined signal into image data related to the transmission view line of the pulses emitted into the object body, characterized in that the following steps are provided:
   combining the response signals relating to the two successive pulses by a weight function (WEIGHT) which, by comparing corresponding samples of the two echo signals (P1, 22, MR1, MR2), assumes values in a range between a maximum value and a minimum value depending on the mutual correlation measure between said corresponding samples of the two signals;
   combining the weight function thereby obtained with the combination of the two echo signals (P1, P2; MR1, MR2) and transforming the resulting signal into image data, i.e. image points (pixels, voxels).

2. A method as claimed in claim 1, wherein the weight function has two predetermined maximum and minimum values which are assumed when the corresponding components of the two successive response signals (P1, P2; MR1, MR2) have equal or opposite signs (equal or opposite phases) respectively, whereas in case of partly unrelated signal samples, the function assumes intermediate values.

3. A method as claimed in claim 1, wherein the correlation weight function has a continuous development or is a function having discrete values depending on the occurrence of specific phase conditions.

4. A method as claimed in claim 1, wherein the response signals (P1, P2; MR1, MR2) are sampled before processing.

5. A method as claimed in claim 1, wherein the at least two successive response signals (P1, P2; MR1, MR2) related to the two successive identical pulses are filtered before being combined with each other and/or with the weight function and/or after being combined with each other and/or with the weight function.

6. A method as claimed in claim 1, wherein one or more signal amplitude thresholds (A, B) are determined, wherewith the two response signals (P1, P2; MR1, MR2) are compared, a threshold function being defined which assumes predetermined values depending on the response signals (P1, P2; MR1, MR2) being above or below said one or more thresholds, said function being combined with the signal defined by the combination of the weight function and by the combination of the response signals (P1, P2; MR1, MR2).

7. A method as claimed in claim 1, wherein the weight function is an EXNOR function applied to the signs of the two successive response signals (P1, P2; MR1, MR2) and which assumes the value 0 when the two echo signals (P1, P2; MR1, MR2) have opposing phases and the value 1 when the two echo signals (P1, P2; MR1, MR2) are in-phase, whereas said function assumes intermediate values for any dephasing intervening between a 180° dephasing and the 0° phase.

8. A method as claimed in claim 1, wherein the weight function is further averaged based on a plurality of successive pairs of response signals (P1, P2; MR1, MR2) generated by a plurality of pairs of successively transmitted signals.

9. A method as claimed in claim 1, wherein the weight function is averaged by low-pass filtering.

10. A method as claimed in claim 1, wherein the weight function is averaged by integration.

11. A method as claimed in claim 1, wherein the threshold function is applied by accounting for the most significant N bits on the sampling vectors of the two received response signals (P1, P2; MR1, MR2).

12. A method as claimed in claim 1, wherein the threshold function is a NOR logic function and assumes the discrete values 0 and 1.

13. A method as claimed in claim 1, wherein the one or more thresholds are determined based on the most significant N and M bits of the two response signals P1, P2; MR1, MR2 being considered for the application of the threshold function.

14. A method as claimed in claim 1, wherein the two response signals (P1, P2; MR1, MR2) related to the two successive identical pulses are combined together by addition or subtraction or multiplication or division or by a combination function.

15. A method as claimed in claim 1, wherein the magnitude of one the two response signals is only considered in the computation of the threshold function.

16. A method as claimed in claim 1, wherein the pulses transmitted to the object body are ultrasonic pulses, said method being provided in combination with a B Mode imaging technique, wherein the amplitude information of all echo signals (P1, P2) having the fundamental transmission frequency is used to determine the brightness of a corresponding pixel and the reception times are used to define the spatial position of pixels in the image corresponding to the line of view.

17. A method as claimed in claim 1, wherein the pulses transmitted to the object body are ultrasonic pulses, said method being provided in combination with ultrasound imaging methods which use echo signals components at the second or higher harmonic of the fundamental transmission frequency (Harmonic Imaging).

18. A method as claimed in claim 17, wherein it is provided in combination with a Pulse Inversion imaging method, wherein one of the two successive transmission signals (P1, P2) is inverted in phase or sign.

19. A method as claimed in claim 17, wherein it is provided in combination with an imaging method, wherein subtraction is performed between the two received echoes (P1, P2).

20. A method as claimed in claim 16, wherein it includes the following steps:
   emitting at least two successive ultrasonic pulses along the same line of view;
   receiving the reflected signals (V1, V2) for said two pulses;

sampling said signals to provide two reception vectors (P1 and P2);

combining together said two signals (vectors) (P1, P2) and transforming the combined signal into image data related to the transmission line of view of the pulses emitted into the object body;

combining the echo signals relating to the two successive ultrasonic pulses by a weight function which, by comparing corresponding samples of the two echo signals (P1, P2), assumes values in a range between a maximum value and a minimum value depending on the mutual correlation measure between said corresponding samples of the two signals; combining the weight function thereby obtained with the combination of the two echo signals (P1, P2) and transforming the resulting signal into image data, i.e. image points (pixels, voxels).

21. A method as claimed in claim 1, wherein the emitted pulses are electromagnetic excitation pulses for Nuclear Magnetic Resonance imaging, the received signals being electromagnetic pulses emitted by the matter when it relaxes from the excited state caused by said excitation pulses.

22. A method as claimed in claim 20, which further includes the following steps:

acquiring data with the normal procedure to form at least two images of the same section;

separating data into real part and imaginary part;

combining these data by a weight function which, by comparing respective samples or real and imaginary parts, assumes values in a range between a maximum value and a minimum value depending on the mutual correlation between said samples corresponding to the two response signals (MR1, MR2);

combining real and imaginary part data with the weight function recomposing signals into real part and imaginary part;

reconstructing the image.

23. An imaging system for implementing the method of claim 1 comprising:

means for generating a succession of pulses and means for emitting said pulses towards the object body;

means for receiving the response signals deriving from emitted pulses;

means for processing the response signals and transforming them into image points related to the information contained in the response signal regarding their position and luminous intensity or color said set of points forming a linear, two-dimensional or three-dimensional image;

characterized in that it additionally comprises:

means for successively repeating at least once an identical pulse, to generate at least two successive related and theoretically identical response signals;

means (7, 13, 18) for weighting the received signals based on the mutual correlation of identical or corresponding components of the at least two response signals (P1, P2; MR1, MR2) corresponding to the at least two identical transmission pulses successively emitted along the same line of view.

24. An imaging system as claimed in claim 23, wherein it is a Nuclear Magnetic Resonance imaging system.

25. An imaging, system as claimed in claim 23, wherein it is an ultrasound imaging system.

26. An ultrasound imaging system as claimed in claim 25, comprising:

at least one transducer for transforming electric signals into ultrasonic pulses, preferably a geometrically and numerically predetermined transducer array (1);

at least one receiving transducer, the same as the transmitting transducer or separate therefrom, preferably a geometrically and numerically predetermined receiving transducer array, which may be the same as the transmitting transducer array or separate therefrom (1);

means (2) for controlling the transmitting and receiving transducers (1) for alternate transmission and reception activation;

means (3) for focusing ultrasonic beams in a certain propagation direction, i.e. along a predetermined line of view by synchronized activation of the transmitting transducers, when a transmitting transducer array (1) is provided;

means (3) for focus reconstruction relative to the received echo signals, when a receiving transducer array (1) is provided, by resettling synchronization relative to the signals received by the individual transducers;

means for sampling the received echo signals;

means (12) for combining together two successive received echo signals (12);

means for processing the received echo signals (P1, P2) to remove the undesired signal components;

means (9) for transforming the processed echo signals into image signals related to at least one point or one line of a three- o two-dimensional image formed by a set of points (pixels or voxels) or by a set of lines;

the means for processing the received echo signals to remove the undesired signal components comprising means (7, 13, 18) for weighting the received signals based on the mutual correlation of identical or corresponding components of two echo signals (P1, P2) corresponding to two identical transmission pulses successively emitted along the same line of view.

27. A system as claimed in claim 26, wherein the means for removing undesired signal components are provided in a processing chain parallel to the processing chain (12) designed for combining the two successive echo signals (P1, P2).

28. As system as claimed in claim 26, wherein there are provided means (16) for combining the output signals of the two parallel processing chains (12, 13, 14).

29. A system as claimed in claim 23, wherein the means for removing the undesired signal components (13) comprise, in the form of particular hardware or of programmable elements, a phase comparator and a logic circuit for executing logic interpretation functions on the phase comparator output, which provides a signal having predetermined levels depending on certain phase conditions between two echo signals (P1, P2) provided to the phase comparator.

30. A system as claimed in claim 29, wherein the logic circuit comprises means for executing a logic phase comparison function, e.g. EXNOR.

31. A system as claimed in claim 23, wherein the means (12) for combining echo signals (P1, P2) consist of a summer or subtractor, and/or multiplier and/or divider circuit.

32. A system as claimed in claim 23, wherein the output of the means (12) for combining echo signals (P1, P2) and the output of the means for removing the undesired signal components (13) are connected to the inputs of a combination circuit (16).

33. A system as claimed in claim 32, wherein the combination circuit is a multiplier (16).

34. A system as claimed in claim 23, wherein it provides passband filters in the form of depth adaptive filters or extraction filters.

35. A system as claimed in claim 23, wherein at least one of the processing chains has a delay circuit (15) for time synchronization of the outputs of the individual processing chains.

36. A system as claimed in claim 23, wherein it additionally comprises a third parallel processing chain having a logic circuit (18) for determining thresholds, comparing them with each pair of echo signals (P1, P2) and determining an output signal having signal levels corresponding to predetermined relation conditions between the threshold/s and the echo signals (P1, P2).

37. A system as claimed in claim 36, wherein the circuit (18) of the third processing chain comprises a logic circuit for executing a threshold function, e.g. a NOR.

38. A system as claimed in claim 36, wherein it has means (20) for combining the output of the third processing chain (18) with the two additional chains respectively comprising the means (12) for combining the two echo signals (P1, P2) and the means (13) for removing the undesired components of echo signals (P1, P2).

39. A system as claimed in claim 36, wherein the means (20) for combining the third processing chain (18) consist of a signal multiplier.

40. A system as claimed in claim 36, wherein the means (20) for combining the third processing chain (18) with the two previous ones (12, 13) are provided downstream from the means (16) for combining the two processing chains (12, 12') designed for combining together the echo signals (P1, P2) and (13) for removing the undesired signal components.

41. A method as claimed in claim 2, wherein the correlation weight function has a continuous development or is a function having discrete values depending on the occurrence of specific phase conditions.

42. An imaging method including the following steps:
   emitting at least two successive pulses along the same line of view into an object body;
   receiving two reflection signals that are generated by the object body in response to said two successive pulses;
   combining said two reflection signals into a combined signal;
   transforming said combined signal into image data related to the transmission view line of the pulses emitted into the object body;
   said imaging method further comprising the following steps:
      combining said two reflection signals by a weight function wherein by comparing corresponding samples of said two reflection signals, the weight function assumes values in a range between a maximum value and a minimum value depending on the mutual correlation measure between said corresponding samples of the two reflection signals;
      combining the weight function thereby obtained with the combination of the two reflection signals into a resulting signal; and
      transforming said resulting signal into image data in the form of image points.

43. An imaging method including the following steps:
   emitting at least two successive pulses along the same line of view into an object body;
   receiving two matter excitation signals that are generated by the object body in response to said two successive pulses;
   combining said two matter excitation signals into a combined signal;
   transforming said combined signal into image data related to the transmission view line of the pulses emitted into the object body;
   said imaging method further comprising the following steps:
      combining said two matter excitation signals by a weight function wherein by comparing corresponding samples of said two matter excitation signals, the weight function assumes values in a range between a maximum value and a minimum value depending on the mutual correlation measure between said corresponding samples of the two matter excitation signals;
      combining the weight function thereby obtained with the combination of the two matter excitation signals into a resulting signal; and
      transforming said resulting signal into image data in the form of image points.

44. A method according to claim 13, comprising the following steps:
   defining two vectors (P1", P2" MR1", MR2") by applying the magnitude function (abs function) to the two response signals (P1, P2; MR1, MR2);
   carrying out a threshold determination by applying the threshold function to the said two vectors;
   the threshold function having component values 1 when among the most significant N bits in the sample vectors of the response signals (P1, P2; MR1, MR2) at least one bit is equal to 1 and having component values 0 in all the other cases.

* * * * *

UNITED STATES PATENT AND TRADEMARK OFFICE
CERTIFICATE OF CORRECTION

PATENT NO. : 6,909,796 B2
DATED : June 21, 2005
INVENTOR(S) : Pomata et al.

It is certified that error appears in the above-identified patent and that said Letters Patent is hereby corrected as shown below:

Column 11,
Line 31, replace "22" with -- P2; --.

Column 13,
Line 62, remove the comma after "An imaging".

Signed and Sealed this

Twenty-fourth Day of January, 2006

JON W. DUDAS
*Director of the United States Patent and Trademark Office*